United States Patent
Berndtsson

(10) Patent No.: US 6,832,679 B2
(45) Date of Patent: Dec. 21, 2004

(54) DEVICE FOR PROCESSING CARD-SHAPED INFORMATION CARRIERS, SUCH AS BANK CARDS, CREDIT CARDS, IDENTIFICATION CARDS, ETC.

(75) Inventor: Anders Berndtsson, Kullavik (SE)

(73) Assignee: Atlantic Zeiser GmbH, Emmingen-Liptingen (DE)

( * ) Notice: Subject to any disclaimer, the term of this patent is extended or adjusted under 35 U.S.C. 154(b) by 10 days.

(21) Appl. No.: 10/390,841

(22) Filed: Mar. 18, 2003

(65) Prior Publication Data

US 2004/0124068 A1 Jul. 1, 2004

(30) Foreign Application Priority Data

Dec. 31, 2002 (DE) .......................................... 102 61 472

(51) Int. Cl.⁷ .............................................. G06K 13/02
(52) U.S. Cl. ................... 198/471.1; 198/478.1
(58) Field of Search ........................ 198/471.1, 478.1; 235/451

(56) References Cited

U.S. PATENT DOCUMENTS

| | | | | |
|---|---|---|---|---|
| 1,766,018 A | * | 6/1930 | Flook ...................... | 198/482.1 |
| 4,135,619 A | * | 1/1979 | Cerboni ................... | 198/471.1 |
| 4,874,076 A | * | 10/1989 | Kaplan et al. ............... | 198/357 |
| 5,104,116 A | * | 4/1992 | Pohjola ....................... | 271/185 |
| 5,114,307 A | * | 5/1992 | Meli et al. ............... | 414/793.1 |
| 5,558,200 A | * | 9/1996 | Whitby et al. ........... | 198/470.1 |
| 6,112,881 A | * | 9/2000 | Osti et al. ................ | 198/468.8 |
| 6,354,427 B1 | * | 3/2002 | Pickel et al. ............. | 198/470.1 |
| 6,474,462 B2 | * | 11/2002 | Wipf et al. ............. | 198/347.1 |
| 6,520,318 B1 | * | 2/2003 | Humele ................... | 198/483.1 |
| 6,722,494 B2 | * | 4/2004 | Nakakado ................... | 198/792 |
| 6,732,498 B2 | * | 5/2004 | Keen et al. ............. | 198/471.1 |

FOREIGN PATENT DOCUMENTS

DE     100 63 313 A1     6/2002

* cited by examiner

Primary Examiner—Douglas Hess
(74) Attorney, Agent, or Firm—Michael J. Striker

(57) ABSTRACT

A device for processing card-shaped information carriers has at least one track, at least one processing station with at least one movable carrier with a plurality of holding elements, at least one delivery element located between the track and the movable carrier, so that the cards are taken by a first delivery element from the path and transferred on the holding elements of the carrier, and then are taken by a second delivery element from the holding elements of the carrier and transferred onto the path, wherein each of the delivery elements has a wheel drivingly rotatable in a rotary direction and provided on its outer periphery with a plurality of holders which are spaced from one another in a peripheral direction for receiving, holding and delivering the cards.

37 Claims, 1 Drawing Sheet

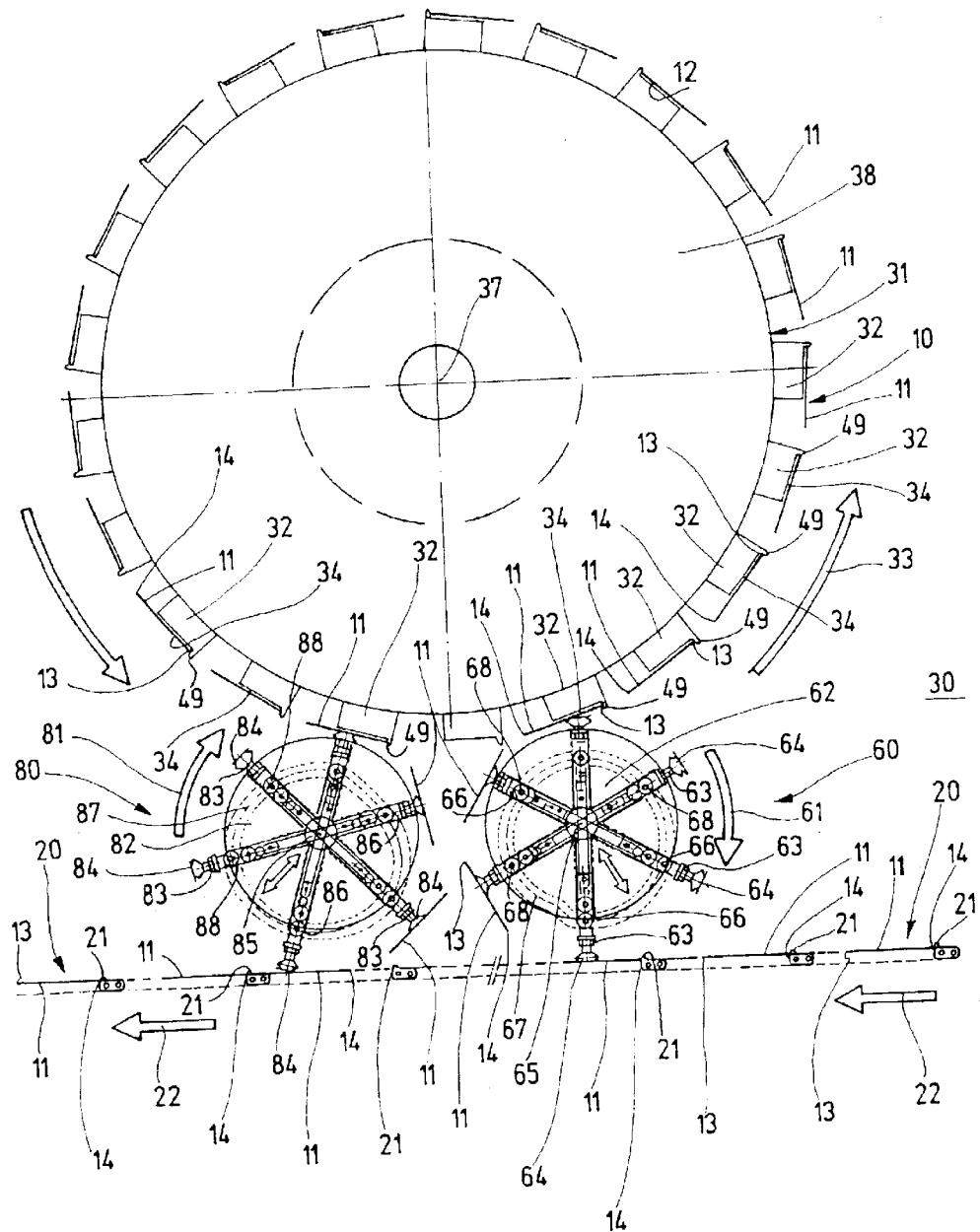

ns, such as bank cards, credit cards, identification cards, and the like.

A known device of this type is disclosed for example in German patent document DE 100 63 313 A1 (U.S. Ser. No. 10/026,982) and has a corresponding feeding unit formed substantially as a mechanical ramp. The arrangement is designed so that only an intermittent operation with respect to for delivery and transportation of the card is possible. While this arrangement is advantageous, the possible processing speeds are however confined within certain limits.

SUMMARY OF THE INVENTION

Accordingly, it is an object of the present invention to provide an arrangement of the above mentioned general type, which is a further improvement of the existing arrangements.

More particularly, it is an object of the present invention to provide an arrangement for processing of card-shaped information carriers, such as bank cards, credit cards, identification cards, etc., which is designed so that a processing of cards is possible in a simple manner and with a very high speed, and at the same time the design has a simple construction and a disturbance-free operation.

In keeping with these objects and with others which will become apparent hereinafter, one feature of the present invention resides, briefly stated, in a device for processing card-shaped information carriers, in which the corresponding delivery unit has a wheel circumferentially driven in a rotary direction, which has on its outer periphery individual holders spaced from one another in a peripheral direction and operative for receiving, holding and delivery of the cards.

The device in accordance with the present invention is simple, cost-favorable, and provides a disturbance-free operation. Since the first and/or second transfer units have a circumferentially driven wheel, in this way the feeding of the individual cards from the track to movable carriers and transfer from the movable carrier back onto the track is possible in a continuous and fast sequence, in particular when it deals with tangential orientation of the cards for each wheel. In this way, high speeds are provided for processing of the cards, which can be up to 50,000 cards per hour and more. There is no danger of functional disturbances.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a schematic side view of parts of a device for processing of card-shaped information carriers in accordance with the present invention.

DESCRIPTION OF THE PREFERRED EMBODIMENTS

A device for processing of cards in accordance with the present invention is provided for processing such cards as bank cards, credit cards, identification cards, etc. The device is identified as a whole with reference numeral 10, and only those parts which are important are illustrated, while the cards are identified with reference numeral 11.

The term "processing" includes any communications, for example supply of informations, reading of informations, programming, etc. The cards 11 which are shown only schematically can be provided with at least one integrated switching circuit with at least one memory, chip and the like which is not shown in detail. The card 11 can be formed for contactless and/or contacting communication, at least in one region on the side 12 identified in the drawing.

The corresponding region which is suitable for the contacting on one side of the card 11, for example on the upper side 12, has for example a contact surface with a plurality of individual contacts which are contacted for processing by contact transducers connected in turn with a corresponding computer system and a current source (DE 100 63 313 A1 U.S. Ser. No. 10/026,982).

For the contactless communication, for example communication means are provided. They can include at least one antenna, in particular coil, wherein the corresponding card 11 also has a corresponding antenna, such as a coil. The processing of such cards 11 in contactless and/or contacting manner, in particular for the reading, programming or the like is generally known and does not have to be described in detail. This is also true for corresponding components of the device 10. The requirements for such devices, in particular with increasing data quantities which must be processed in connection with such cards, for reading and/or programming are that they must provide a maximum possible high speeds for the processing of the cards 11. It is desirable to obtain the speeds for example up to 50,000 cards per hour or more.

The device 10 has a track which is identified as a whole with reference numeral 20 and formed as a transporting track with drivers 21 for transportation of the cards 11 in the arrow direction 22. The track 20 formed as a transporting track has, for example, at least one chain which carries the drivers 11. By means of the chain, the cards 11 which abut for example with their edges against the rails are transported forwardly in the arrow direction 22 with a rear edge 14 abutting correspondingly against one driver 21. The transporting track can have at least one bend. Each driver 21 is composed, for example, of a cam, catch and the like. The track 20 extends for example horizontally in the shown embodiment.

As can be seen, the device 10 has at least one station 30 located in the region of the track 20. It is believed to be understood that the track can have a plurality of stations 30 which are, for example, designed identically and located one after the other in the transportation direction identified with the arrow 22. One or several stations 30 can be provided, for example, for reading the memory of the individual cards 11, and further stations which follow in the transportation direction of arrow 22 at corresponding distances can be formed analogously to the station 30 for programming of the individual cards 11. In this case a multiplication of the processing speed, for example, a doubling of the speed for two stations 30 is achieved. The intermediate time, during which the cards 11 are brought from the first station 30 to the subsequent station, can be used for other processing steps, for example testing of a code key which is read in the first station from the corresponding memory of the card 11, by comparing with another code key which is, for example, integrated in a computer controlling the reading system.

It is also possible to provide another design which is not shown in the drawings, with several preferably identical stations 30 arranged near one another transversely to the transportation direction 22 of the track 20.

The shown station 30 has a movable carrier 31 with several holding elements 32 which are provided for contacting and/or contactless communication with the cards 11, as not shown in the drawings. The carrier 31 in the shown embodiment has twenty one holding elements 32. Each holding element 32 serves for engaging and holding a corresponding card 11 during the movement phase of the carrier 31 with processing of the card 11 which is performed during this time and thereafter for delivering the corresponding card 11 after the processing. The individual holding unit 32 has a not shown pressure and/or suction element, for providing the pressure of a medium, for example gas, such as air, and for forming a pressure device with overpressure and a suction device with negative pressure. Under the action of the pressure and/or suction element, the individual cards 11 are engaged and held by suction. The engaged and held cards are brought in the corresponding holding element 32 into electrically conductive contact with contact transducers for the contacting communication and held there, so that the cards 11 can be processed during this time, for example they can be read, programmed, or treated in other ways.

In accordance with a not shown embodiment the carrier can be formed as a longitudinally extending track which is similar to the track 20 and can extend substantially parallel to the latter. In the shown embodiment, to the contrary, the at least one carrier 31 is continuously rotatable around an axis 37 in an arrow direction 33, preferably with constant speed. The axis 37 extends at a distance above the track 20, for example also horizontally and thereby transversely, in particular perpendicular to the track 20. The at least one carrier 31 with the individual holding elements 33 rotates above the track 20 and inside such a plane which is located at least substantially in a vertical alignment with the track 20.

The at least one carrier 31 has at least one disc 38, drum, wheel or the like. The disc 38 is driven circumferentially by a not shown drive around the axis 37. For example it is driven in the forward transporting direction 20 in a direction of arrow 33 which is opposite to the direction of the arrow 22, or in other words in counterclockwise direction. The arrangement is selected so that the processing of a card 11 taken from a holding element 32 is concluded after a rotation of the carrier 31, in particular of the disc 38. The diameter of the at least one carrier 31, in particular the disc 38 and/or its rotary speed and/or the number of holding elements 33 arranged in substantially equal peripheral angular distances can be selected and varied in correspondence with a predetermined processing efficiency.

The individual holding element 32 of the disc 33 has flat receiving surfaces 34 with at least one stop 49 which is operative opposite to the rotary direction of the disc in accordance with the arrow 33. The receiving surfaces 34 and the stops 49 are arranged at substantially identical peripheral angular distances from one another along the periphery of the disc 38. For example three openings can open in the receiving surfaces 34 and communicate through not shown channels with a negative pressure source for producing the suction force and/or with a positive pressure source for producing an overpressure. The receiving surfaces 34 are provided on components which are fixedly connected with the carrier 31. The corresponding receiving surfaces 34 when needed can be also provided with not shown lateral guiding stops, for additionally orienting and guiding the sucked and fixed cards 11 in the region of the longitudinal edges. The stop 49 located in a circumferential direction of the carrier 31 operates so that when a card 11 is received, it abuts with its front edge 13 against the stop 49 and remains oriented in this position.

The device 10 further has at least one first delivery element 60 and/or second delivery element 80 placed between the track 20 and the carrier 31. The cards 18 are removable by the first delivery element 60 from the track 20 and transferred onto the holding element 32 of the carrier 31, and then after a revolution of the carrier 31 they are removable from the holding devices 32 by the second delivery element 80 and deliverable again onto the track 20. In the shown embodiment the second delivery element 80 in advantageous manner is formed in correspondence with the first delivery element 60, that is however not absolutely necessary. Each delivery element 60, 80 has a wheel 62 or 82 which is rotatably driven in a rotary direction of arrow 61 or 81. On its outer periphery it is provided with a plurality of holders 63 or 83 which are spaced from one another in a rotary direction and provided for receiving, holding and delivery of the cards 11. In the shown embodiment each wheel 62 or 82 is provided with total six holders 63 or 83. The individual holders 63 or 83 of the corresponding wheel 62 or 82 have yieldable receiving elements 64 or 84 which are adjustable for example by elastic deformation, for example as a suction cup.

In accordance with a not shown embodiment, the holding elements 32 of the carriers 31 are connected with a negative pressure and/or positive pressure source and controlled so that the holding elements 32 take the card 11 by suction action from a corresponding holder 63, hold it during the rotation of the carrier 31, and after this deliver to the second wheel 82 after removal of the suction action. Also, in the not shown embodiment the holder 63 or 83 of the corresponding wheel 62 or 82 can be connected with a negative pressure and/or positive pressure source and controlled so that the holder 33 of the wheel 62 removes the card 11 by suction action from the track 20, during the revolution of the wheel 62 holds the same, and delivers on the holding element 32 of the carrier 1 after the removal of the suction action. In the same way the holder 83 of the other wheel 82 is controlled so that the holder 83 removes the card by suction action from the holding elements 33 of the carrier 31, holds it during the revolution of the second wheel 82, and delivers the card 11 to the track 20 after removal of the suction action.

The peripheral angular distances of the individual holding element 32 from one another deviate from the distances between the individual drivers 21 of the track 20. In the shown embodiment the peripheral angular distance between the holding element 32 is smaller than the distance between the drivers 21 of the track 20. In accordance with this, each wheel 62, 82 is formed so that the peripheral angular distance of the holder 62 or 82 of the corresponding wheel 62 or 82 in the region of the track 20 is adjusted to the distance of the drivers 21 for the cards 11 from one another, and in the region of the oppositely located carrier 31 is adjusted to the distance of the holding elements 32 from one another. For this purpose the holders 63 or 83 of the corresponding wheels 62 or 82 are held radially movably and controlled with respect to the axes 65 and 85 of these wheels.

The holders 63 or 83 are movable in a controlled fashion in a radial direction relative to the corresponding wheels 62 or 82, so that their peripheral angular distance from one another is reduced during the wheel rotation over one peripheral angular region and is increased during the rotation over another peripheral angular region. The first wheel 62 and/or the second wheel 82 on the one hand substantially fills the region between the carriers 31, in particular the disk 38 on the one hand and the track 20 on the other hand with its corresponding efficient diameter. The first wheel 62 and/or the second wheel 82 rotate in accordance with the arrow 61 or 81 opposite to the disc 38, for example in a rotary direction which corresponds to the forward transporting direction of the track 20 in accordance with the arrow 22, or in other words in a clockwise direction.

In accordance with a shown embodiment, the holders 63 of the first wheel 62 are controlled so that during the wheel rotation over a circumferential angular region in direction toward the track 20 they are moved radially outwardly to produce a greater circumferential angular distance between the holders 63, and during the wheel rotation over a subsequent another peripheral angular region in direction toward the carrier 31 they are moved radially inwardly with reduction of the circumferential angular distance between the individual holders 63.

It is shown only schematically in the drawings that the holders 63 or 83 are provided with guiding bodies 66 and 86, in particular carriages, which are radially movably guided relative to the corresponding wheels 62 and 82. The carriages carry the receiving elements 64 or 84, in particular suction cups. The holders 63 or 83, in particular guiding bodies 66 or 86 with the receiving members 64 or 84, are arranged substantially in form of a star with respect to the axes 65 and 85 of the corresponding wheel 62 and 82. The guiding bodies 66 and 86 guide each wheel 62 and 82 along radial guiding surfaces, for example guiding grooves. For controlling the radial movement the corresponding wheel 62 or 82 has a cam track 67 or 87, in particular a groove which is off-center at least partially. The corresponding cams 68 or 88, for example rollers, of the individual guide bodies 66 and 86 engage with the cam tracks 67 and 87. The cam tracks 67 and 87 can be arranged spatially fixed, so that during the rotation of the corresponding wheels 62 and 82 the cams 68 and 88 rotate in the cam tracks 67 and 87 and thereby the radial movement of the guiding bodies 66 and 86 with the receiving members 64 and 84 is controlled.

The drawings shows that each wheel 62 and 82 is arranged under the carrier 31, in particular the disc 38. In accordance with another not shown embodiment this relationship can be turned for example by 90°, so that the corresponding wheel 62 and 82 can be arranged laterally near the carrier 31. The at least one movable carrier 31, in particular the disc 38 is driven around such an axis 37 in the rotary direction 32, which extends transversely to the course of the track 20 and above the track 20. In accordance with another not shown embodiment it extends laterally near the track 20. The rotary direction of the carrier 31 in accordance with the arrow 33 is counter to the forward transporting direction in accordance with the arrow 22 of the track 20. The first wheel 62 and/or the second wheel 82 is arranged substantially in the same plane as the carrier 31, in particular the disc 38. It is located for example in a plane which corresponds to the plane of the drawings. The first wheel 62, when considered in the forward direction in accordance with the arrow 22 of the track 20, is located before the center 37 of the disc 38 at a distance from it. The second wheel 82 is located after the center of the disc 38 at a distance therefrom.

The axis 65 of the first wheel 62 located before has the same distance from the axis 37 of the disc 38 as the axis 85 of the wheel 82 located after. Similarly to the disc 38, the first wheel 62 and/or the second wheel 82 can continuously rotate with corresponding constant speed.

The cards 11 are continuously supplied by the track 20, removed by the first wheel 62 from the track 20 by suction, transported by the rotary movement of the first wheel 62 in the arrow direction 61 to the disc 38, and during the rotation of the disc 38 are delivered on it substantially in the region of a tangential plane. During the delivery the cards 11 abut with their front edge 13 against the stop 49 and are thereby reproducibly oriented in their position. The cards 11 can be completely processed during a rotation of the disc 38, for example programmed, so that when a holding element 32 after rotation in the rotary direction 33 reaches the region of the second wheel 82, a card can be removed with its second wheel 82 from a holding element 32 of the disc 38 by suction. Also, for this purpose the wheel 82 moves continuously, so that this process is performed also continuously. The corresponding removed card is held by suction on the wheel 82 and its holder 83, and transported by the rotary movement by the second wheel 82 in the arrow direction 81 to the track 20 and delivered onto it, for example by running into a not shown ramp, in which the card 11 is engaged in the region of both longitudinal edges and thereby released, during the rotation of the wheel 82, from the corresponding receiving member 84.

The arrangement is formed so that the wheel 62 of the second delivery device 80 with its holders 83, in particular guiding bodies 86 with the receiving members 84, have the same radial diameter and/or effective diameter as the wheel 62 of the first delivery device 60 with its holders 63, in particular guiding bodies 66 with receiving members 64. It is to be understood that the wheel 82 rotates in the same rotary direction of the arrow 81 as the first wheel 62. The wheels 62 and 82 are arranged symmetrically with respect to a diameter of the carrier 31, in particular the disc 38, which is oriented transversely to the track 20, in particular substantially perpendicularly to it. The axis 65 and 85 of both wheels 62 and 82 extend at the same distances from the track 20, in particular above it.

It is believed to be clear that by means of the holder 33, in particular the receiving member 64 on the guiding body 66, the first wheel 62 during rotation of the first wheel 62 in clockwise direction in accordance with arrow 61 successively in a continuous process lifts a card 11 substantially parallel to the course of the track 20 and from the latter. During the rotary movement of the wheel 62 a receiving member 64 reaches an orientation substantially perpendicular to the course of the track 20, so that the receiving member 64 can remove a card from the track 20 by suction, and then it is held on the receiving member 64 of the wheel 62. During a further rotation of the wheel 63, this card 11 is guided substantially in a tangential orientation with respect to the holding elements 32 of the disc 38 to a corresponding free holding element 32 and delivered onto it. The delivery is performed with at least lifting of suction on the receiving element 64, and in some cases desirably by pressure switching from negative pressure to positive pressure, so that the card 11 is pressed away from the receiving member 64 by the negative pressure and in direction to the receiving surface 34 of the holding element 32, where the card 11 is engaged and held by suction.

After for example a rotation of the disc 38 the card 11 reaches the region of the second wheel 82 and is lifted by a holder 83, in particular a receiving member 84 of the second wheel 82 during rotation of this wheel in a tangential orientation with respect to the holding element 32 of the disc 38 from this holding element 32. This is provided by suction in the region of the receiving member 84 and can be additionally supported by at least lifting of the suction on the holding element 32 or by switching from the suction to the overpressure, whereby the card is acted upon by the holding element 32 in direction toward the receiving member 84 of the wheel 82.

The card 11 which is transferred from a receiving member 84 is moved during the further rotation of the wheel 82 in the arrow direction 81 also in a substantially tangential orientation to the upper side of the track 20, and delivered onto the track 20 in a region between two drivers 21 and so that the card that lies on the track 20 is driven by abutment of the driver 21 against its rear edge 14 in corresponding orientation, as during the supply to the first wheel 62. The driving and corresponding delivery of the individual cards each in a substantially tangential orientation has the advantage that the corresponding card does not change its orientation or changes it only insignificantly, so that no significant relative movements for engagement and delivery of the cards between the components of the station 30 are necessary, and thereby continuous and high rotary speeds of the rotating components can be provided.

The device 10 is designed so that a large number of cards can be handled in a short time and fast for processing, in particular for reading and/or for programming. The speeds can reach for example 50,000 cards per minute or even more. The danger of operational disturbances is excluded. The arrangement 10 has a simple construction, is cost favorable and operationally secure.

The present invention also deals with a method processing the cards 11, which includes individual method features disclosed in the preceding description. In this method the individual cards 11 are moved in a continuous flow along a line and processed, substantially in correspondence with the Greek letter omega.

It will be understood that each of the elements described above, or two or more together, may also find a useful application in other types of constructions differing from the types described above.

While the invention has been illustrated and described as embodied in device for processing card-shaped information carriers, such as bank cards, credit cards, identification cards, etc., it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for processing card-shaped information carriers, comprising at least one track formed as a transportation track for transportation of cards; at least one processing station located in a region of said track and having at least one movable carrier with a plurality of holding elements operative for engaging and holding a corresponding card during a movement phase of said carrier with processing performed during this time and for delivery a corresponding card after the processing; at least one delivery element selected from the group consisting of a first delivery element, a second delivery element and both, said at least one delivery element being located between said track and said movable carrier, so that cards are taken by said first delivery element from said track and transferred on said holding elements of said carrier, and said cards are taken by said second delivery element from said holding elements of said carrier and transferred onto said track, each of said delivery elements having a wheel which is drivingly rotatable in a rotary direction and has on its outer periphery a plurality of holders which are spaced from one another in a rotary direction for receiving, holding and delivering the cards, wherein said holders have guiding bodies which are radially movable relative to a corresponding one of said wheels, and wherein each of said wheels has a cam track which is arranged at least partially off center and engages with a corresponding cam of a corresponding one of said guiding bodies.

2. A device as defined in claim 1, wherein said holders of each of said wheels are yieldable and each have a receiving member.

3. A device as defined in claim 2, wherein said revolving members of said holders are adjustable by elastic deformation.

4. A device as defined in claim 1, wherein said holders of a corresponding one of said wheels communicate with a source selected from the group consisting of a negative pressure source and a positive pressure source and are controlled so that said holders take the cards by suction from said track and from said holding elements of said carrier, hold them during rotation of the corresponding wheel, and deliver the cards after removal of suction onto the holding elements of the carrier end onto the track.

5. A device as defined in claim 4, wherein an axis of said first wheel which is located before, as considered in a forward transporting direction of said track, has a same distance from an axis of said disk as an axis of said second wheel which is located after said axis of said disk.

6. A device as defined in claim 1, wherein said holders of a respective one of said wheels are held radially movably relative to en axis of said wheel.

7. A device as defined in claim 6, wherein said holders of a corresponding one of said wheels being movable in a controlled fashion relative to said wheel in a radial direction so that a rotary angular distance of said holders from one another reduces during a rotation of said wheel over one rotary angular region and increases during a rotation of said wheel over another rotary angular region.

8. A device as defined in claim 1, wherein a rotary angular distance of said holders of a corresponding one of said wheels in a region of said track corresponds to a distance between track drivers for the cards from one another and in a region of maid carrier corresponds to a distance of said holding elements from one another.

9. A device as defined in claim 1, wherein said holders have guiding bodies and carry an element selected from the group consisting of a driver and a receiving element.

10. A device as defined in claim 9, wherein said guiding bodies are formed as carriages, while said holders have receiving elements formed as suction cups.

11. A device as defined in claim 9, wherein said holders with said receiving elements are arranged in form of a star ground an axis of a corresponding one of said wheels.

12. A device as defined in claim 9, wherein said holders with said receiving elements are radially movable controlled by cam tracks of a corresponding one of said wheels and by corresponding cams being in engagement with said cam tracks.

13. A device as defined in claim 1, wherein said cam track is formed as a groove, while said cam is formed as a roller.

14. A device as defined in claim 1, wherein a corresponding one of said wheels is arranged in a position selected from the group consisting of under said carrier and laterally near said carrier.

15. A device as defined in claim 1, wherein said carrier has at least one disk which is driven in a rotary direction around an axis which is oriented in an orientation selected from the group consisting of transversely to a course of said track and above said track and laterally near said track.

16. A device as defined in claim 15, wherein said holding elements of said at least one disk have receiving surfaces with at least one abutment which is opposite to the rotary direction of said at least one disk, said receiving surfaces with said at least one abutment being arranged at substantially equal rotary angular distances from one another on an outer periphery of said at least one disk.

17. A device as defined in claim 15, wherein at least one of said wheels substantially fill a region between said disk and said track with a corresponding operative diameter.

18. A device as defined in claim 15, wherein at least one of said wheels rotates opposite to a direction of rotation of said disk.

19. A device as defined in claim 15, wherein at least one of said wheels is arranged substantially in a same plane as said disk.

20. A device as defined in claim 15, wherein said first wheel when considered in a forward transporting direction of said track is located before a center of said disk, while said second wheel is arranged alter said center of said disk.

21. A device as defined in claim 15, wherein said track and said wheels are arranged so that the cards are supplied continuously by said track, removed by said first wheel from said track, transported by a rotation of said wheel toward said disk, and during rotation of said disk are delivered onto said disk.

22. A device as defined in claim 21, wherein said second wheel removes the cards continuously from said disk, and during rotation of said second wheel transports the cards toward said track and deliver the cards onto said track.

23. A device as defined in claim 1, wherein said holding elements of said carrier communicate with and are controlled by a source selected from the group consisting of a negative pressure source and an overpressure source, so that the cards are taken by suction from the corresponding one of said holders of said first wheel, held during rotation of said disk, and after this with at least lifting of suction are delivered to said second wheel.

24. A device as defined in claim 1, wherein at least one of said wheels rotates in a rotary direction which corresponds to a forward transporting direction of said track.

25. A device as defined in claim 1, wherein said carrier and at least one of said wheels rotate continuously with a same speed.

26. A device as defined in claim 1, wherein said second delivery element is formed in correspondence with said first delivery element.

27. A device as defined in claim 1, wherein said wheel of said second delivery element with its holders has a same wheel diameter and/or effector diameter as said wheel of said first delivery element with its holders.

28. A device as defined in claim 1, wherein said wheel of said second delivery element rotates in a same rotary direction as said wheel of said first delivery element.

29. A device as defined in claim 28, wherein said wheels of said delivery elements have axes which extend at identical distances from said track and above said track.

30. A device as defined in claim 1, wherein said wheels of said delivery elements have axes which, with respect to a diameter of said carrier, are arranged transversely to said track and symmetrically.

31. A device as defined in claim 30, wherein said wheels of said delivery elements are arranged with said axes substantially perpendicularly to said track.

32. A device as defined in claim 1, wherein said holder of said first wheel has a receiving member on a guiding body which during rotation of said first wheel removes a card correspondingly one after the other substantially parallel to a course of said track from said track, holds the card, and during rotation of said first wheel guide the card substantially in a tangential orientation with respect to the holding elements of said carrier formed as a disk to said holding elements and then deliver said card onto the holding elements.

33. A device as defined in claim 1, wherein said holders of said second wheel has a receiving member on said guiding bodies wherein during rotation of said second wheel, said receiving member removes a card correspondingly one after the other substantially in a tangential orientation with respect to said holding elements of said carrier formed as a disk from respective one of said holding elements, holds the card, and by turning of said second wheel, guide the card onto said track and deliver the card substantially parallel to a course of the track onto the track.

34. A device as defined in claim 1, wherein said carrier is formed as a disk and has twenty one holding elements.

35. A device as defined in claim 1, wherein said wheel of said first delivery element and said wheel of said second delivery element have each six holders.

36. A device for processing card-shaped information carriers, comprising at least one track formed as a transportation track for transportation of cards; at least one processing station located in a region of said track and having at least one movable carder with a plurality of holding elements operative for engaging and holding a corresponding card during a movement phase of said carrier with processing performed during this time and for delivery a corresponding card after the processing; at least one delivery element selected from the group consisting of a first delivery element, a second delivery element and both, said at least one delivery element being located between said track and said movable carder, so that cards are taken by said first delivery element from said track and transferred on said holding elements of said carrier, and said cards are taken by said second delivery element from said holding elements of said carrier and transferred onto said track, each of said delivery elements having a wheel which is drivingly rotatable in a rotary direction and has on its outer periphery a plurality of holders which are spaced from one another in a rotary direction for receiving, holding and delivering the cards, wherein said holders have guiding bodies which are radially movable relative to a corresponding one of said wheels, wherein said guiding bodies carry an element selected from the group consisting of a driver and a receiving element, wherein said holders with said receiving elements are radially movable controlled by cam tracks of a corresponding one of said wheels and by corresponding cams being in engagement with said cam tracks.

37. A device for processing card-shaped information carriers, comprising at least one track formed as a transportation track for transportation of cards; at least one processing station located in a region of said track and having at least one movable carrier with a plurality of holding elements operative for engaging and holding a corresponding card during a movement phase of said carder with processing performed during this time and for delivery a corresponding card after the processing; at least one delivery element selected from the group consisting of a first delivery element, a second delivery element and both, said at least one delivery element being located between said track and said movable carrier, so that cards are taken by said first delivery element from said back and transferred on said holding elements of said carrier, and said cards are taken by said second delivery element from said holding elements of said carrier and transferred onto said track, each of said delivery elements having a wheel which is drivingly rotatable in a rotary direction and has on its outer periphery a plurality of holders which are spaced from one another in a rotary direction for receiving, holding and delivering the cards, wherein said holders have guiding bodies which are radially movable relative to a corresponding one of said wheels, wherein each of said wheels has a cam track which is arranged at least partially off center and engages with a corresponding cam of a corresponding one of said guiding bodies, and wherein said cam track is formed as a groove, while said cam is formed as a roller.

* * * * *